United States Patent [19]

Lee et al.

[11] 4,230,912
[45] Oct. 28, 1980

[54] DIAL PULSE SENSOR AND REPEATER CIRCUIT

[75] Inventors: David Q. Lee, Boca Raton, Fla.; Richard M. Rovnyak, Schaumburg, Ill.

[73] Assignee: GTE Automatic Electric Laboratories Incorporated, Northlake, Ill.

[21] Appl. No.: 13,598

[22] Filed: Feb. 21, 1979

[51] Int. Cl.³ ............................................. H04Q 1/36
[52] U.S. Cl. .................. 179/16 EA; 328/164
[58] Field of Search .......... 179/16 AA, 16 E, 16 EA, 179/18 F, 18 FA, 18 AD, 18 AH, 81 C, 16 EC; 328/164

[56] References Cited

U.S. PATENT DOCUMENTS

| | | | |
|---|---|---|---|
| T949,003 | 8/1976 | Earle et al. | 179/16 EA |
| 3,819,866 | 6/1974 | Hawley | 179/16 AA |
| 3,848,094 | 11/1974 | Russell | 179/18 FA |
| 3,867,567 | 2/1975 | Herron et al. | 179/16 EA |
| 3,867,580 | 2/1975 | Russell | 179/16 EA |
| 4,079,272 | 3/1978 | Howatt | 307/311 |
| 4,095,125 | 6/1978 | Ingle | 307/311 |
| 4,126,765 | 11/1978 | Calder et al. | 179/18 AH |

*Primary Examiner*—Bernard Konick
*Assistant Examiner*—Randall P. Myers
*Attorney, Agent, or Firm*—Robert J. Black; Frank J. Bogacz

[57] ABSTRACT

A line voltage sensor and dial pulse repeater circuit for use in conjunction with a digital PABX telephone system connecting a subscriber station to a switching center providing for detection of off-hook condition of the subscriber's set, detection of irregularly shaped dial pulse and correction of the irregularly shaped dial pulses to allow accurate reconstruction of the dial pulses originally transmitted via the subscriber's set.

7 Claims, 2 Drawing Figures

VOLTAGE WAVEFORMS

DIAL PULSE SENSOR AND REPEATER CIRCUIT

BACKGROUND OF THE INVENTION (1) Field of the Invention

The present invention relates to detection of dial pulse information and more particularly to a circuit for dial pulse reconstruction for use in a digital private automatic branch exchange to accurately reconstruct a subscriber's dial pulses despite resistive, inductive and capactive distortion of the dial pulses due to the telephone line loop.

(2) Description of the Prior Art

In a telephone system it is necessary that a switching center accurately obtain digits in the form of dial pulses dialed by a subscriber via his telephone station in order to properly connect one subscriber to another and accurately bill a subscriber. The functioning of the switching center depends entirely upon the accurate reception of these dialed pulses. Distortion of the dial pulses occurs due to the length of the lines connecting the subscriber station to the switching center because of the resistance, inductance and capacitance of the line. Detecting and repeating dial pulses has customarily been performed at the central office by relays. The use of relays for this function currently is prohibitive because of the relatively large size for the relays and their high cost.

The use of electronic circuits to replace the relay's function is typified by the following U.S. Pat. No. 3,772,474 issued on Nov. 13, 1973 to O. G. Wisotzky and U.S. Pat. No. 3,879,583 issued on Apr. 22, 1975 to E. F. Rooks.

The Wisotzky patent discloses a dial pulse correcting circuit using two timing circuits which cooperate to provide minimum timing intervals for the make and break intervals of a dial pulse. The output signals of each of the two timing circuits are gated together to form the leading end and trailing edge of the dial pulse. The two timing circuits disclosed therein are connected in cascade fashion so that the output of the first timing circuit initiates the timing function of the second circuit thereby providing the proper minimum pulse with of a dial pulse.

The circuit disclosed above has various inperfections due to the relatively large quantity of components used and the need to adjust the timing functions by component values. In addition, isolation of the output signal from the input is not provided.

In the Rooks patent a circuit is disclosed for receiving signals from a telephone line, continuously generating and sustaining a reference voltage which is a fixed percentage of peak value of the received signal. The circuit provides an output whenever the received signal level exceeds the reference voltage level. No isolation of input and output signal is provided. This circuit is designed to ignore contact bounce by generation of a dial pulse subsequent to the detection of the incoming originating dial pulse. This operating is performed asynchronously and requires many components and hence utilizes a relatively large amount of space and is costly.

Therefore, it is the objective of the present invention to provide a new dial pulse reconstruction circuit for use in a digital PABX to synchronously detect and reconstruct dial pulses transmitted by a subscriber station to a switching center, utilizing state of the art electronic technology thereby providing for the utilization of a relatively small amount of space and rendering a low cost circuit.

A feature of the present invention includes means for dynamically setting the threshold detection level of the circuit by laser trimming of thick film resistance components of the circuit.

SUMMARY OF THE INVENTION

The present invention consists of a line voltage sensor and dial pulse repeater circuit for the detection of irregularly shaped dial pulses and the correction of the dial pulses to an allowable form. This circuit includes a voltage detection mechanism connected between the tip and ring leads of a telephone subscriber's line circuit which is longitudinally balanced between these leads and insensitive to longitudinal loop currents. An optical coupler circuit is connected between the voltage sensor and a switching center. This optional coupler provides an output signal, which is electrically isolated from the dial pulses, representing the corrected form of the incoming irregularly shaped dial pulses. In addition, a timing circuit is connected to the voltage sensor and to the tip lead operable to act as a high value capacitor providing for current flow through the optical coupler circuit during the break condition of the dial contacts in order to provide the full pulse width of the dial pulses.

When a subscriber station is in the "off-hook" condition and the associated dial contacts are closed DC loop current flows between the subscriber's station and the switching center. The voltage sensing portion of the circuit is set to detect a particular DC voltage level at the tip and ring leads which signifies that the subscriber has gone to an "off-hook" condition and is presently ready to dial the called number. As the called telephone number is dialed by the subscriber a series of dial pulses is transmitted from the subscriber's station to the switching center via connecting line. Due to the electrical characteristics of this connecting line, it acts as a resistance, capacitance, and inductance element. Thereby, the dial pulse waveforms received at the switching center appear considerably distorted.

As a result, the voltage at the tip and ring leads is of such a value that no current flows into the sensing circuit. Prior to the closure of the contacts the voltage at the tip and ring leads was of a value that current did flow through the sensing circuit thereby turning-on the optical coupler circuit and producing a logic "0" condition on the output signal. As a result of the contact closure, the output signal makes a transition from logic "0" to logic "1", providing indication of the presence of the dial pulse.

When the dial contacts proceed to the open condition, current again flows through the sensor circuit bringing the output signal to a logic "0" condition. However, this change takes place slowly and provides a time distortion of the resultant output signal. Therefore, a timing circuit is included, which functions as a unidirectional capacitor having a relatively large capacitance. This timing circuit provides current flow during the change of contact closure, to inhibit the timing distortion of the output signal. Because of the switching nature of the timing circuit the circuit disconnects and inhibits its operation during the condition of dial contact closure.

The threshold sensing level the circuit is dynamically set by laser trimming of a thick film resistor (included in the circuit) to allow the threshold value to be set at a predetermined level. In addition, means are provided for the protection against overload voltages to the optical coupler.

DESCRIPTION OF THE PREFERRED EMBODIMENT

Figure 1:
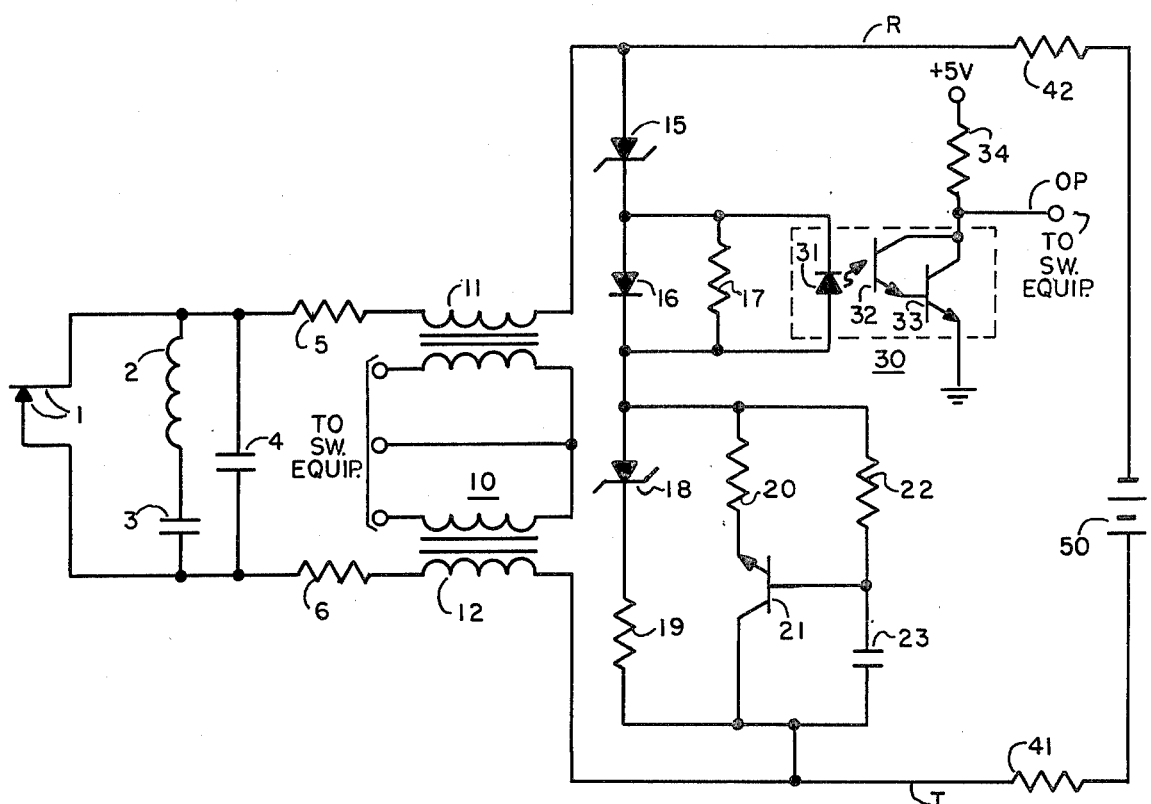
FIG. 1 is a schematic diagram of a voltage sensor and dial pulse repeater circuit embodying the principles of operation of the present invention.

Referring to FIG. 1, the dial pulse sensing circuit is shown connected between the tip lead T and the ring lead R located at the central office. The central office battery 50 is connected to the sensor circuit through battery feed resistors 41 and 42. Relay contacts 1 represent the subscriber's station dialing equipment. As the subscriber dials the called telephone number, a series of dial pulses is transmitted along the closed loop between the subscriber station and the central office via the tip lead T and ring lead R. Inductor 2 and capacitor 3 represent the bridged ringer circuit forming a portion of the subscriber's station equipment. Capacitor 4 and resistors 5 and 6 represent the distributed resistance and capacitance of the line connecting the subscriber's station to the switching center. Hybrid transformer 10 comprising windings 11 and 12 connect the tip lead T and ring lead R to the switching equipment at the central office.

The dial pulse sensor and repeater circuit is shown connected between the tip lead T and the ring lead R. The dial pulse sensor circuit includes zener diode 15 connected between the ring lead R and a second zener diode 18. Zener diode 15 has its cathode connected to the anode of zener diode 18 by way of light emitting diode 31. Resistor 19 is connected between the cathode of zener diode 18 and the tip lead T. Diode 16 is connected between zener diodes 15 and 18 and in shunt with resistor 17. Light emitting diode 31 of optical coupler 30 is also connected in shunt with resistor 17 and diode 16. Transistors 32 and 33 of optical coupler 30 are connected in Darlington configuration and have a connection to the central processing unit of the switching equipment whereby the output signal representing the reconstructed dial pulse is transmitted via the OP terminal from the sensor circuit to the switching equipment. A timing circuit is connected between the common connection of diode 16 and zener diode 18 and the tip lead T. This timing circuit includes resistors 20 and 22, capacitor 23 and transistor 21. Resistors 20 and 22 are connected in common to the cathode of zener diode 18. Further, resistor 20 is connected to the emitter of transistor 21 and resistor 22 is connected to the base of transistor 21. Capacitor 23 is connected between the base and collector of transistor 21 and to the tip lead T.

When the subscriber's station is in the "off-hook" condition, loop current flows from the positive terminal of office battery 50 through battery feed resistor 41, winding 12 of hybrid transformer 10, line resistance 6 the closed dial contacts 1, line resistance 5, winding 11 of hybrid transformer 10 returning to the negative terminal of office battery 50 through battery feed resistor 42. A voltage is present at the tip lead T and ring lead R equal in magnitude to the office battery voltage 50 less the voltage drop of battery feed resistors 41 and 42. During this condition, the voltage across the tip lead T and ring lead R was of a sufficient value so that the combined break-down voltage of zener diodes 15 and 18 was not exceeded and therefore, no current flow through the sensor circuit was detected. Output signal OP was therefore at the logic "1" level.

Prior to this when the subscriber was "on-hook", the voltage at the tip lead T and ring lead R exceeded the combined break-down voltages of zener diodes 15 and 18. Current flowed through the sensor circuit and through light emitting diode 31 of optical coupler 30. Thereby, transistors 32 and 33 are "turned-on" resulting in current flow from the +5 volt source through resistor 34 to ground. As a result the output signal at terminal OP changed state from logic "1" to logic "0".

As the dial contacts 1 proceed to the open condition, current flow through the sensing circuit ceases. However, this change is slow and the voltage does not exceed the combined break-down of zener diodes 15 and 18 for from 10 to 15 ms. Thereby, the resulting output signal observed at terminal OP is shortened in time from the original dial pulse transmitted by the subscriber's station. As the dial contacts 1 open, low value resistor 20 transistor 21 and capacitor 23 function to provide continued current flow to light emitting diode 31. The effective capacitance of this sub circuit composed of resistors 20, 22 capacitor 23 and transistor 21 multiplies the value of capacitor 23 by a factor of 50 to 100 times. Thereby, the wave form provided at output terminal OP is apparently lengthened in time to conform with the original dial pulse sent by the subscribers station, although slightly delayed in time due to transmission time.

Diode 16 acts to prevent voltage reversals of the tip lead T and ring lead R from supplying a relatively high voltage and destroying the sensitive light emitting diode 31 of optical coupler 30. In addition, resistor 17 is functionally trimmed using laser trimming techniques to provide a precise turn-on voltage for light emitting diode 31.

Figure 2:
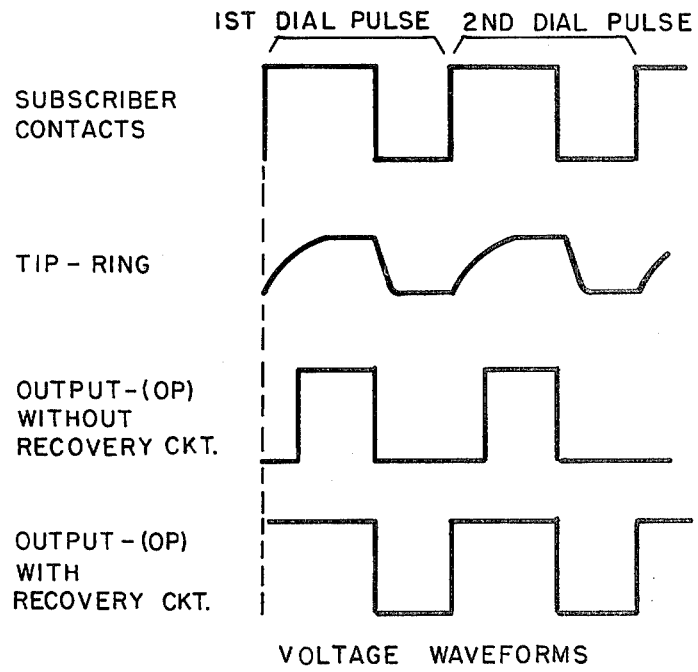
FIG. 2 is a diagram depicting the voltage waveforms at various points within the subscriber's loop circuit.

Referring to FIG. 2, wave forms comprising the dial pulses are shown at various points of the subscriber loop circuit. The subscriber contacts waveform shows the dial pulses as originally transmitted by the subscriber's station. The tip-ring waveform depicts the dial pulses as seen at the tip and ring leads. At the tip and ring leads, considerable distortion is noted due to the effect of the line and station equipment, coupled to the central office. Next, the output signal is terminal OP is shown without the timing recovery circuit comprising resistors 20, 22 transistor 21 and capacitor 23 as shown in FIG. 1. Time distortion of these dial pulses is shown because of the slow changing voltage as the dial contacts open. The final waveform shows the output signal at terminal OP with the timing recovery circuit providing an accurate reconstruction of the dial pulses originally transmitted by the subscriber's station.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A dial pulse sensor and repeater circuit for use in a telephone system including at least one telephone subscriber station connected to a switching center including a battery and switching equipment via a first and a second leads, said subscriber station including dial contacts for causing conductions and interruptions of a DC signal on said first and said second leads, said dial pulse sensor and repeater circuit comprising:

voltage level sensing means connected between said first and said second leads operated to detect a particular voltage level between said leads in response to said switching center battery applied to said leads by pulses generated by said dial contacts;

optical coupler means including a light emitting diode and a resistor adjusted to provide a precise voltage and current threshold for operation of said light emitting diode, said optical coupler means connected between said voltage level sensing means and said switching equipment operated in response to said voltage level detected by voltage level sensing means to provide an output signal representative of said dial contact pulses for transmission to said switching equipment; and circuit timing means connected to said voltage level sensing means and to said first lead for permitting current flow during said interruptions caused by said dial contacts of said subscriber station, said circuit timing means operated during said interruptions of said dial contacts and said circuit timing means non-operated during said conductions of said dial contacts.

2. A dial pulse sensor and repeater circuit as claimed in claim 1, wherein: said voltage level sensing means includes first and second zener diodes and a first resistor, series connected between said first and said second leads.

3. A dial pulse sensor and repeater circuit as claimed in claim 2, wherein: said voltage level sensing means further includes a diode series connected between said first and second zener diodes protecting said optical coupler means from polarity reversals of said battery.

4. A dial pulse sensor and repeater circuit as claimed in claim 3, wherein: said optical coupler means further includes a pair of transistors in Darlington configuration, said light emitting diode is connected in shunt with said diode, whereby said optical coupler provides for electrical isolation between said dial contact interruptions and said output signal.

5. A dial pulse sensor and repeater circuit as claimed in claim 2, wherein: said first zener diode has its anode connected to said second lead and its cathode connected to said second zener diode's anode and said first resistor connected between the cathode of said second zener diode and said first lead.

6. A dial pulse sensor and repeater circuit as claimed in claim 1, wherein: said circuit timing means includes a resistor and a capacitor series connected between said voltage level sensing means and said first lead for providing current flow through said optical coupler means during break condition of said dial contacts and providing an effective high capacitance circuit utilizing a relatively low capacitance component.

7. A dial pulse sensor and repeater circuit as claimed in claim 6, wherein: said circuit timing means further includes a second resistor and transistor connected in shunt with said first resistor and capacitor, said transistor having its base connected to the common connection of said first resistor and capacitor, said second resistor connected between said first resistor and said emitter of said transistor, said collector of said transistor connected to the common connection of said capacitor and said first lead.

* * * * *